F. A. SCHOSSOW.
WATER CLOSET.
APPLICATION FILED JAN. 31, 1910.

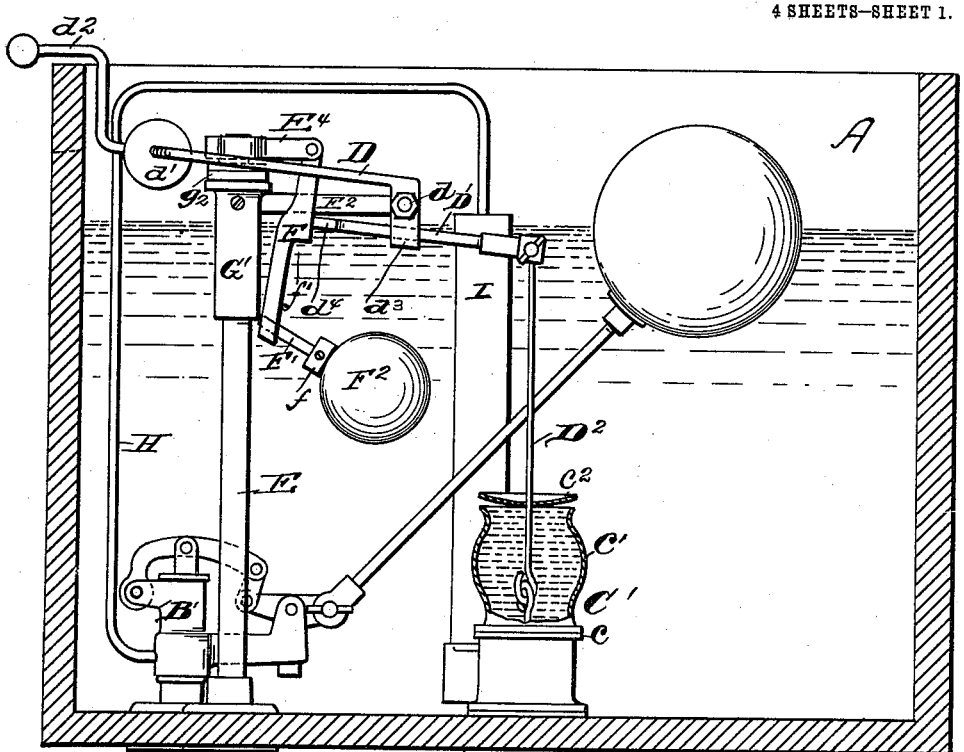
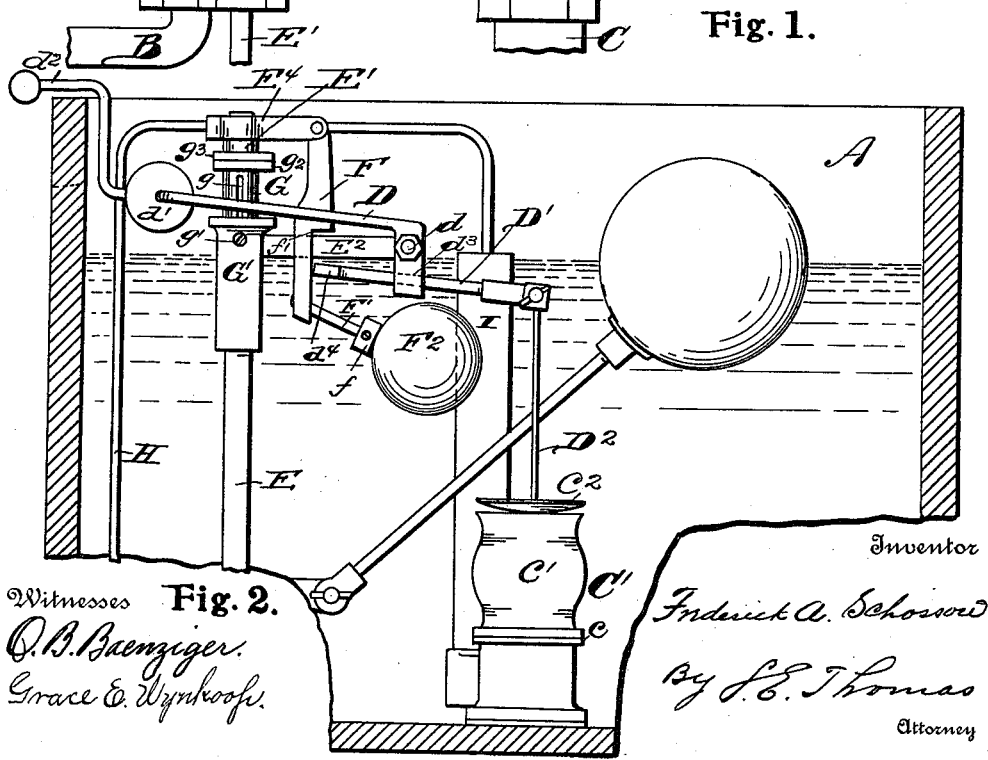

1,008,737.

Patented Nov. 14, 1911.

4 SHEETS—SHEET 2.

F. A. SCHOSSOW.
WATER CLOSET.
APPLICATION FILED JAN. 31, 1910.

1,008,737.

Patented Nov. 14, 1911.

4 SHEETS—SHEET 3.

F. A. SCHOSSOW.
WATER CLOSET.
APPLICATION FILED JAN. 31, 1910.

1,008,737.

Patented Nov. 14, 1911.
4 SHEETS—SHEET 4.

Witnesses
O. B. Baenziger.
Grace E. Wynkoop.

Inventor
Frederick A. Schossow
By J. E. Thomas
Attorney

UNITED STATES PATENT OFFICE.

FREDERICK A. SCHOSSOW, OF DETROIT, MICHIGAN.

WATER-CLOSET.

1,008,737. Specification of Letters Patent. Patented Nov. 14, 1911.

Application filed January 31, 1910. Serial No. 540,976.

*To all whom it may concern:*

Be it known that I, FREDERICK A. SCHOSSOW, citizen of the United States, residing at Detroit, county of Wayne, State of Michigan, have invented a certain new and useful Improvement in Water-Closets, and declare the following to be a full, clear, and exact description of the same, such as will enable others skilled in the art to which it pertains to make and use the same, reference being had to the accompanying drawings, which form a part of this specification.

My invention relates to an improvement in water closets in which the outlet of the flushing tank valve is automatically operated upon releasing the closet seat.

One object of the invention is to provide means whereby the outlet valve cannot be repeatedly opened or closed by manipulating the seat or controlling lever until after the tank has first discharged its contents and again filled.

Another object is to adapt the means for connection with any type of "high" or "low-down" tank outlet valve,—such as the gooseneck or cone siphon valve,—or valves of the ball float type.

Another object is to provide means for maintaining the tripping mechanism in engagement with the outlet valve lever until sufficient water has passed to insure the siphoning of the remainder of the contents of the tank before the outlet valve returns to its seat.

Another object is to provide means whereby the mechanism may be adjusted to provide for the passage of any desired amount of water before the outlet or starting valve returns to its seat.

Another object is to insure against the outlet valve being held open indefinitely and to avoid the delicate adjustment of the parts or frequent re-adjustment of the tripping lever as is often required by devices now in use.

Other advantages and improvements will hereafter appear.

Figure 3:
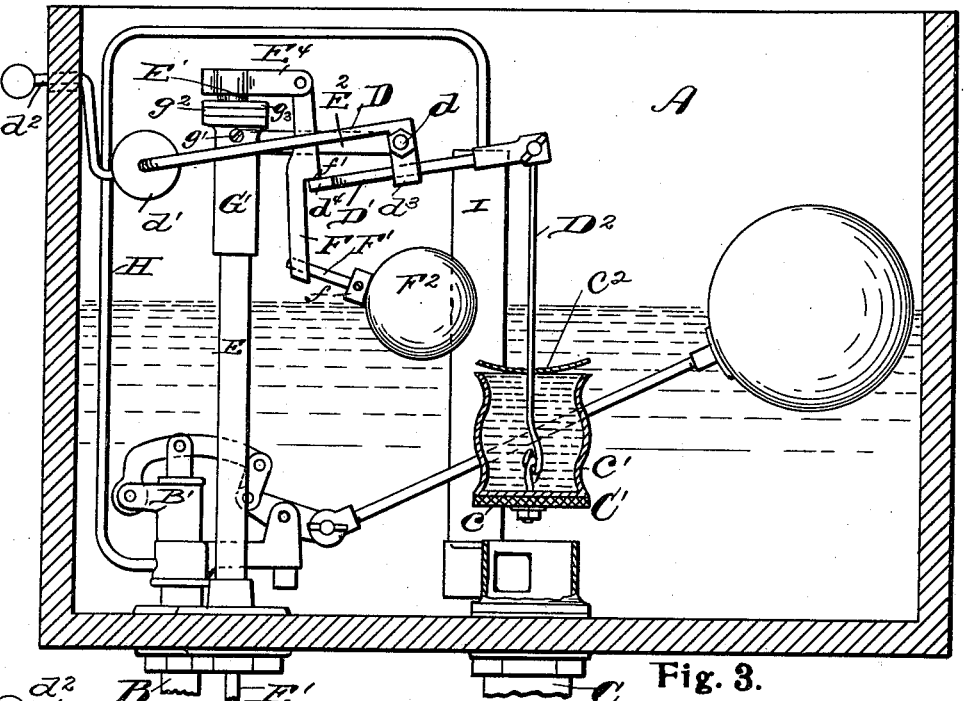
Figure 4:
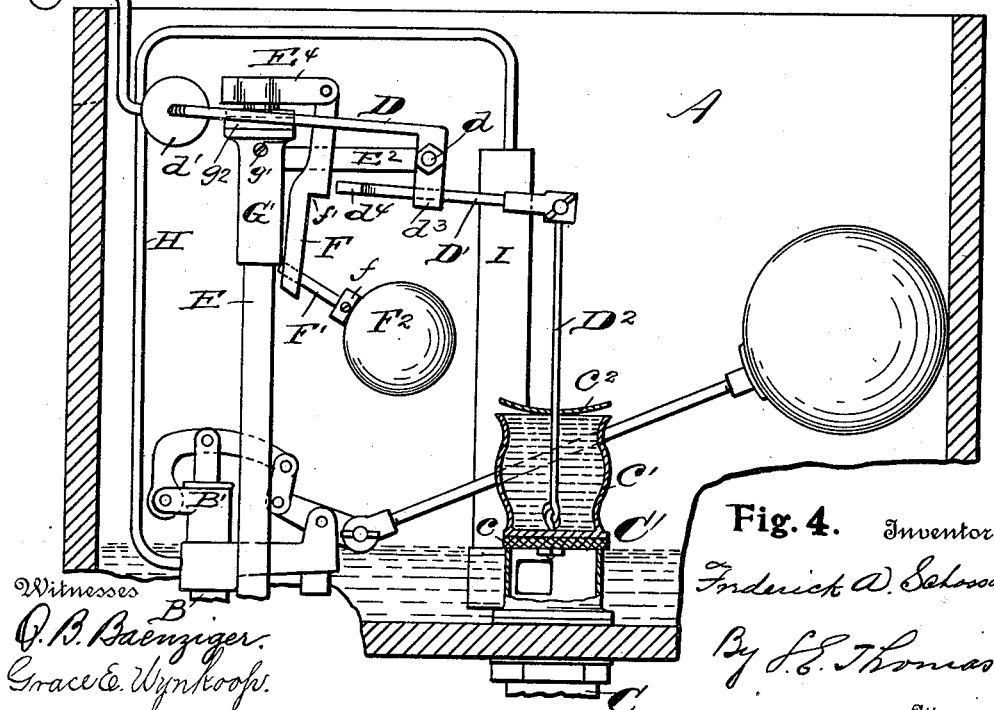
Figure 5:
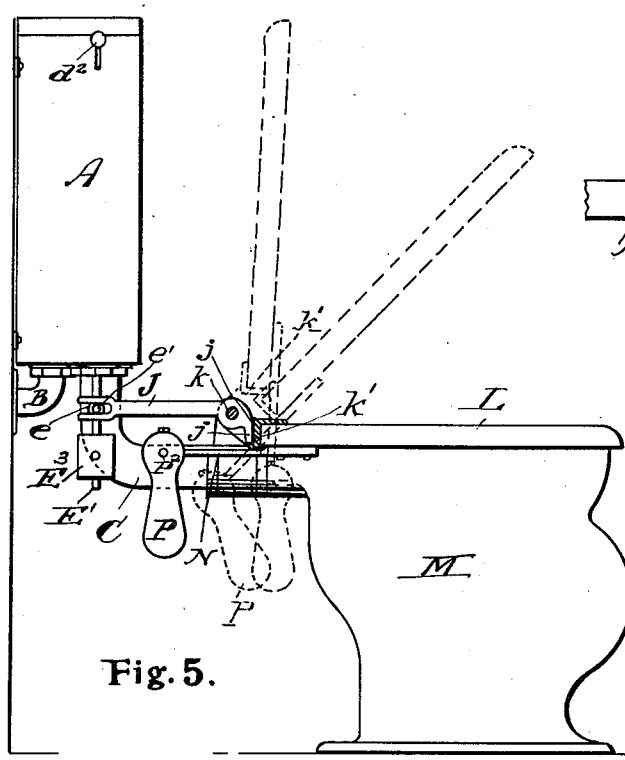
Figure 7:
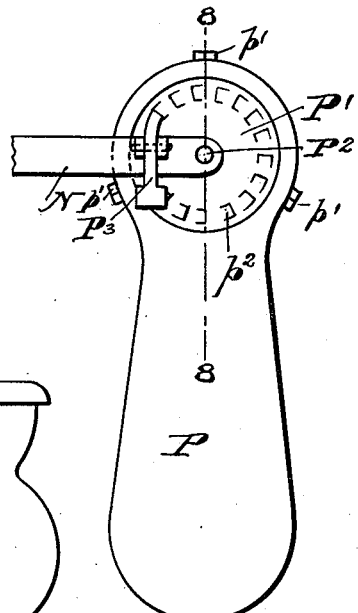
Figure 6:
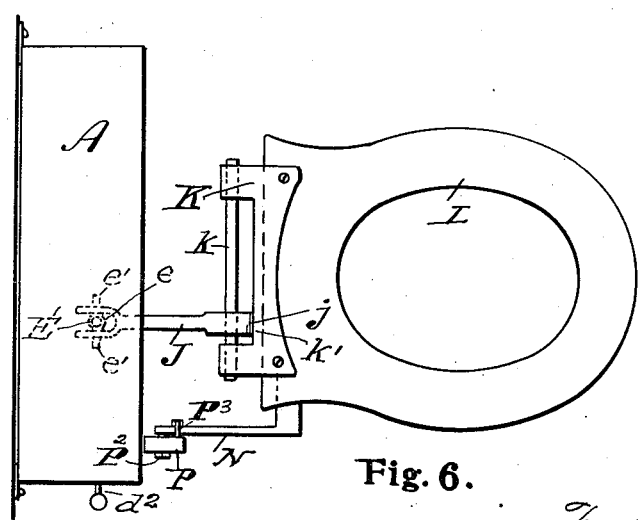
Figure 8:
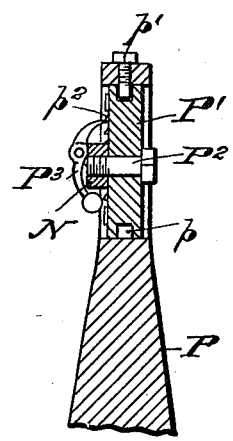
Figure 9:
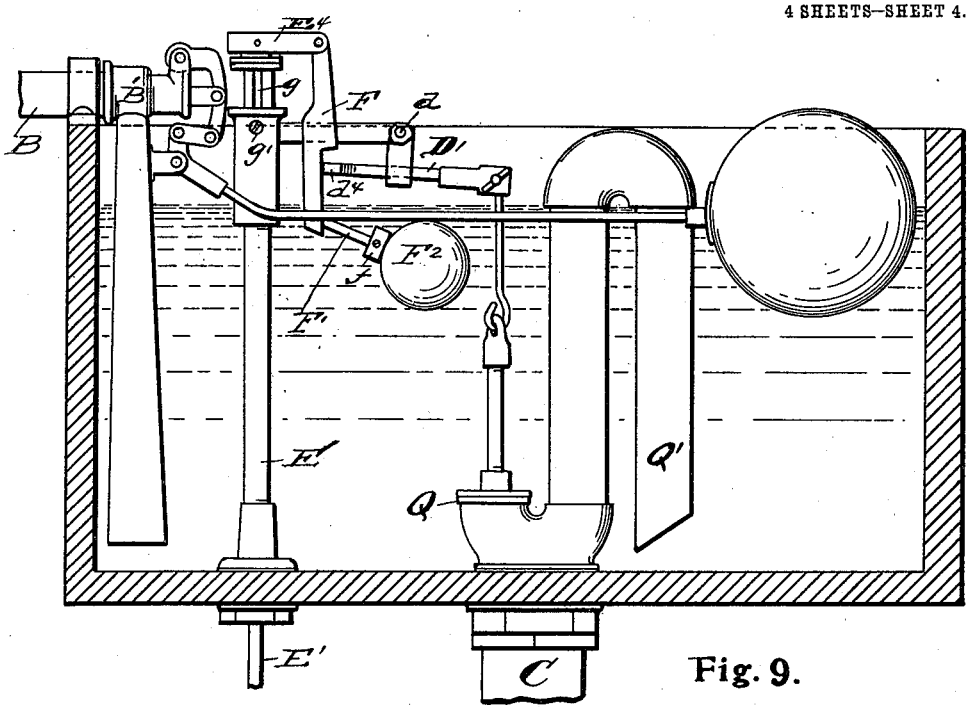

In the drawings accompanying this specification: Figure 1 is a vertical longitudinal section through the tank as it appears when filled with water, the mechanism controlling the water being in normal condition,—as when the seat is elevated,—the latter however, not being shown in this or the three following views. Fig. 2 is a similar sectional view of the tank, the trip-float mechanism being elevated, (the result of manually lowering the seat,) ready to engage the outlet valve lever. Fig. 3 is a like sectional view of the tank, showing the position of the outlet valve and the tripping mechanism controlling the same upon the seat being permitted to return to its normal or elevated position. Fig. 4 is a like sectional view of the tank, the discharge valve being seated, its controlling lever released by the tripping mechanism and the inlet valve open to again fill the tank with water to the altitude shown. Fig. 5 is a side elevation of a closet with tank connected, (with parts in section,) showing in dotted lines the relative respective positions of the seat and its controlling weight as the seat gradually assumes a vertical position when released. Fig. 6 is a plan view of the closet and tank shown in Fig. 5. Fig. 7 is a detail view of the seat weight and a portion of the seat connecting lever in side elevation. Fig. 8 is a sectional view through the weight on line 8—8 of Fig. 7. Fig. 9 is a longitudinal sectional view of the tank showing the tripping mechanism adapted to actuate a return bend siphon valve.

Referring to the letters of reference placed upon the drawings: A denotes the tank, B the water inlet pipe, B′ the ballcock controlling the admission of water to the tank.

C indicates the discharge pipe, C′ a valve controlling the delivery of water from the tank to the closet through the discharge pipe and as shown in Figs. 1 to 4, consists of a disk $c$ secured to the bottom of the open water bucket $c'$, provided with a cover $c^2$ to keep out solid matter that might otherwise settle therein.

D is a lever pivoted at $d$ to a projecting arm $E^2$ carried by the tubular standard E rising from the bottom of the tank.

$d'$ is a weight mounted on the free end of the lever D.

$d^2$ is an extension arm secured to the end of the lever for manually operating it. At the opposite end of the lever D is a depending leg $d^3$ to which is secured an arm D′ to one end of which is engaged the valve rod D² in turn linked to the discharge valve C′.

E′ is a lift rod sleeved in the tubular standard E, its lower end projecting through the bottom of the tank and to which is secured a suitable weight E³. Mounted upon the upper end of the lift rod E′ is an arm E⁴ to which is pivoted a swinging latch F adapted to engage the free end $d^4$ of the arm D'. Projecting from the lower end of the latch F is a rod F' upon which is mounted a weight $f$, and at its end is a ball-float F². The weight $f$ being provided to insure a certain release of the latch F from the free end of the arm D', as will be hereafter explained. Secured to the lift rod directly below the arm E⁴ is a casting G adapted to enter a sleeve G' mounted on the upper end of the standard E.

$g$ is a groove formed in the casting G and $g'$ is a projecting guide pin in the sleeve G' designed to enter the groove $g$ to prevent the rotation of the lift rod E' within the tubular standard, thereby assisting in its proper operation.

$g^2$ is a rubber gasket carried by the lift rod below the washer $g^3$ mounted thereon, the purpose of which is to deaden the jar that would otherwise result from the downward movement of the rod.

H is a pipe leading from the ball-cock B' into the overflow pipe I in turn connected with the discharge pipe C,—the purpose of which is to supply the "after flow" or water seal following the flushing of the closet.

Secured to the lift rod E' below the tank is a casting $e$ having projecting arms $e'$ engaged by the forked arm J pivoted on the pintle $k$ of the seat hinge K.

L is the seat to which one of the members of the hinge K is attached and M is the closet bowl to which the other member of the hinge is engaged. The forked arm J is provided with a downwardly projecting portion having a relatively flat surface $j$ adjacent with the end of the seat adapted to abut with a correspondingly flat surface $k'$ on the seat member of the hinge K; the object being to cause the arm J to tilt on the hinge pintle $k$ when the seat is lowered thereby raising the rod E'. Upon thus lifting the rod E' the notch $f'$ of the swinging latch F is raised above the free end $d^4$ of the arm D' (see Fig. 2) the action of the ball-float F² causing the latch F to swing into position to engage the arm D' upon the release of the seat L from its lowered position.

N is an arm secured to the seat projecting toward the tank A. Suspended from the end of the arm N is a weight P. The weight P is provided with an opening at its upper end in which is set a disk P' formed with a channel $p$ in its periphery to receive the projecting ends of the set screws $p'$ supported in the encircling wall of the weight P, whereby the weight is secured against lateral displacement while being free to turn upon the disk. The disk P' is provided with a central aperture to receive the bolt P² by which it is supported upon the arm N and upon which the disk is free to turn under certain conditions hereafter explained.

Formed on one face of the disk are ratchet teeth $p^2$ adapted to be engaged by the weighted pawl P³ carried by the arm N.

Having indicated the several parts by reference characters, the construction and operation of the apparatus will be readily understood. It has been previously indicated that Fig. 1 of the drawings shows the controlling mechanism in its normal position, the tank filled with water ready for flushing as when the seat (not shown) is elevated; while the three following figures disclose the successive steps or the cycle of operations automatically performed by the mechanism to discharge the water from the tank for flushing the closet directly following its use, and to again refill the tank. When the seat is elevated the lift rod E' is in its lowermost position, (due to the action of the weight E³),—this position of the lift rod results in the notch of the swinging latch F of the tripping mechanism being below the plane of the free end of the arm D'. Upon lowering the seat to a horizontal position the arm J is caused to tilt upon the pintle $k$ of the seat hinge due to the flat surface $k'$ of the seat member of the hinge abutting with the flat end $j$ of the arm J. This action of the arm J lifts the rod E' by means of the forked end of the arm engaging the projecting arms of the casting $e$, secured to said lift rod. The lift rod being raised the notched portion of the swinging latch F is thus elevated above the free end of the arm D' thereby permitting the latch to swing upon its pivot in the direction of the free end of the arm D' owing to the action of the float F². This places the notched portion $f'$ of the swinging latch in position to engage the free end of the arm D' when the lift rod is lowered, as clearly shown in Fig. 2. Upon releasing the seat from its horizontal position, the weight P causes the seat to swing to a vertical position, the detailed operation of which will be hereafter explained. The seat being raised, the weighted lift rod is free to drop to the limit of its movement, the jar being relieved by the gasket $g^2$ near the end of the rod striking the sleeve G' on the upper end of the tubular standard. The descending lift rod causes the swinging latch F to engage the free end of the arm D' as shown in Fig. 3, thereby lifting the discharge valve C' and thus permitting the water to escape through the pipe C to flush the closet. When the water in the tank falls below the float F² the combined weight of the float and the weight $f$ serves to swing the latch F out of engagement with the free end of the arm D' leaving the valve C' free to return to its seat immediately following the discharge of the water from the tank. It will be readily understood, however, that the water bucket $c'$ on the top of the valve C' which serves as a weight to close the valve, will not operate as such until after the water in the tank has been lowered sufficiently for the water in the bucket to become active as a weight to overcome the weight $d'$ mounted on the opposite end of the lever D. As soon as this condition prevails the valve C' will be seated due to the weight of the bucket. The ball-cock B' being now opened, water will be admitted to the tank until it reaches its maximum level thereby returning the parts to their normal positions as indicated in Fig. 1. In order that the seat may gradually assume a vertical position and thus avoid striking the tank case or wall upon its release from a horizontal plane, the weighted pawl $P^3$ carried by the arm J is provided to engage the ratchet teeth $p^2$ on the disk P' whereby the weight is forced to swing on the periphery of the disk in lieu of the bolt $P^2$,—as it is free to do when the seat is manually lowered to a horizontal position. The enlarged bearing surface thus provided increases the frictional resistance between the parts resulting in the seat gradually assuming a vertical position without tendency to jar or damage the fixtures. As the seat swings toward a vertical position, the pawl engages the ratchet, the friction between the annular wall of the weight and disk keeping the weight off its normal balance (as indicated by the dotted lines in Fig. 5) thus retarding its otherwise rapid downward movement, as will be clearly manifest.

In Fig. 9 is shown the tripping mechanism employed to actuate the valve Q to start the operation of the siphon Q' of this type of flushing tank, the tripping mechanism being in position to operate the starting valve upon the seat (not shown) being released from its horizontal position as has been previously explained.

It may now be seen that my improved float-trip mechanism provides a certain means for holding the outlet valve open as long as may be desired. By fixing the altitude of the float at a point slightly below the normal high-level of water in the tank, the trip-float mechanism holds the outlet valve open until the water drops below this level only, but the float may be lowered to a point where it does not release the outlet valve lever until practically all of the contents of the tank are discharged. I prefer, however, to place the float at the relative altitude shown in the drawings (slightly below the normal water level) because with this construction, as soon as the float releases the outlet valve lever, it swings out of engagement therewith and thus prevents the tank from again being flushed by any manipulation of the seat until the tank has discharged its contents and again filled. In my apparatus I provide against a common fault heretofore present in this type of mechanism, it being made to engage the outlet valve during the down stroke of the tripping device in engagement with the outlet valve lever which has for this reason been free to again descend to its seat as soon as the tripping device completed its stroke, hence, the outlet valve was always apt, if the stroke was made too fast, to bounce or be drawn back to its seat without flushing the closet, it being a well known fact that at the commencement of flushing there is considerable suction downward until all the air is expelled from below the outlet valve. For this reason a type of valve such as shown in Fig. 9 could not be used with any degree of certainty, because unless the person using the closet equipped with these former automatic devices was careful not to permit the tripping device to operate too rapidly, not enough water would pass from the tank to siphon the remainder of the contents when the outlet valve or starting valve returned to its seat. In my apparatus by merely altering the altitude of the trip-float, the starting valve can be held open while any desired amount of water passes through said starting valve. I also overcome the delicate adjustment which has heretofore been necessary with devices of this class, it being essential to so adjust the tripping device that the outlet valve was lifted to the maximum and yet provide for the tripping means passing out of engagement before the termination of the stroke, else the outlet valve would be held open indefinitely. It has been the necessity for accomplishing the engagement and release of the outlet valve during the instant of time that the tripping device is operative that has necessitated the accurate primary adjustment and frequent re-adjustment of the tripping device in this class of apparatus. It will also be seen that in my apparatus that upon the water rising in the tank the tripping device is drawn into close relation with the end of the outlet valve lever, in fact the upward movement of the float is limited entirely by coming into close engagement with the end of said lever;—therefore any slight wear of the tripping mechanism or lever will have no effect whatever upon the operation of this device, which thus adjusts itself automatically to any variation that may occur on account of the parts becoming worn.

While the drawings illustrate an arrangement by which the tank may be flushed either manually or automatically, it is obvious by disengaging the lever for manual operation this feature may be omitted entirely, or upon removing the trip-float mechanism the tank may be adapted for manual operation only.

In place of a single clutch for the trip this may be a ratchet instead, in order to operate types of valves where it may not be desirable to open as wide as those shown in the drawings, or it may be desirable to have a variation of adjustment in the point of contact with the clutch, or it may be desirable to have the outlet valve open even if the trip is not raised to its maximum point of travel.

Having thus described my invention, what I claim is:—

1. In a device of the character described, a flushing tank, a hinged seat, a valve controlling the discharge of water from the tank, a hollow standard in the tank, a movable weighted rod mounted in the standard and adapted to be operated by the seat, means connecting the seat with the rod for actuating the latter, and a float-trip mechanism suspended from the upper end of said rod to hold the valve open a predetermined period after lowering the rod.

2. In a device of the character described, a flushing tank, a hinged seat, a valve controlling the discharge of water from the tank, a lever adapted to operate said valve, a hand-operated lever having connection with the aforesaid lever, a movable weighted rod adapted to be operated by the seat, a member rigidly secured to one end of said rod, a latch swingingly connected to said rigid member and provided with a notch intermediate its ends for detachable engagement with the valve operating lever, and means having connection with said swinging latch and movable with the latch to engage and disengage the latter from said valve operating lever, and when in engagement with the latter to hold it in such position as to cause the valve to remain open a predetermined period after lowering the rod.

3. In a device of the character described, a flushing tank, a hinged seat, a valve controlling the discharge of water from the tank, a standard in the tank, an arm secured to the standard, a hand-operated lever pivoted on said arm, a lever carried by said hand-operated valve to operate the valve, a weighted rod mounted in said standard and adapted to be operated by the seat, means connecting the seat with the rod for actuating the latter, and a float-trip mechanism suspended from the rod adapted to engage the discharge valve lever to hold the valve open a predetermined period after lowering the rod.

4. In a device of the character described, a flushing tank, a hinged seat, a valve controlling the discharge of water from the tank, a standard in the tank, an arm secured to the standard, a hand-operated lever pivoted on said arm, a lever carried by said hand-operated valve to operate the valve, a weighted rod mounted in said standard and adapted to be operated by the seat, means connecting the seat with the rod for actuating the latter, a member rigidly secured to said rod, and a float-trip mechanism connected to said rigid member and including a latch for engagement with the discharge valve lever to hold the valve open a predetermined period after lowering said rod.

5. In a water closet, a flushing tank, a valve controlling the discharge of water from the flushing tank, a hinged seat, a lever to operate said valve, a vertically movable weighted rod adapted to be raised by the lowering of the closet seat, a swinging latch pivoted to an arm carried by the rod, and a float and weight mounted upon a rod projecting from said latch whereby it may be brought into engagement with the discharge valve lever for actuating the latter, or disengaged therefrom, subject to the altitude of the water in the tank.

In testimony whereof, I sign this specification in the presence of two witnesses.

FREDERICK A. SCHOSSOW.

Witnesses:
   GRACE E. WYNKOOP,
   SAMUEL E. THOMAS.

---

Copies of this patent may be obtained for five cents each, by addressing the "Commissioner of Patents, Washington, D. C."